July 15, 1958  H. G. BURGOYNE  2,843,293
AUTOMATIC VENDING MACHINE
Filed July 9, 1956
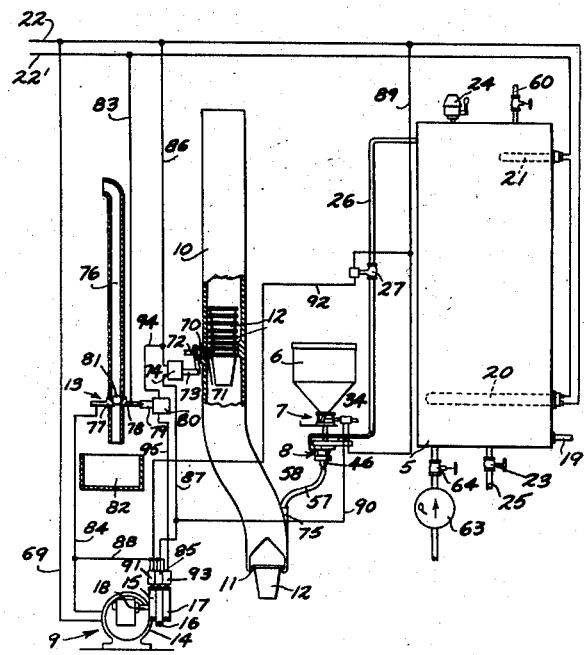
Fig. 1.
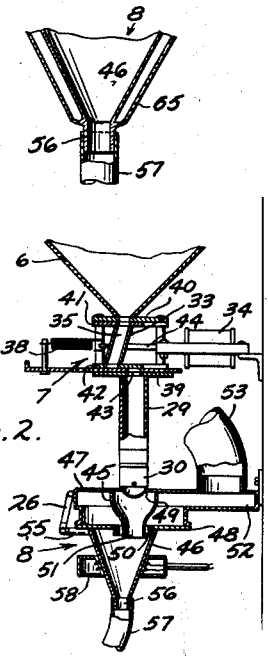
Fig. 6.
Fig. 2.
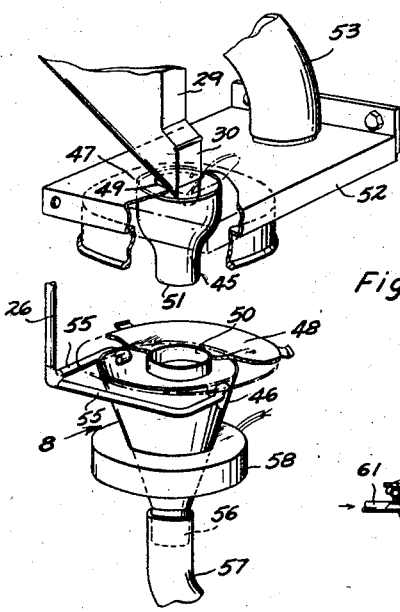
Fig. 4.
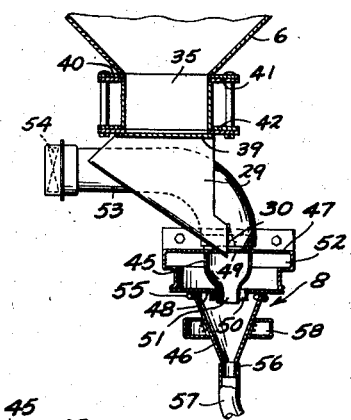
Fig. 3.
Fig. 5.
INVENTOR.
HARRIS G. BURGOYNE
BY Warren F.B. Lindsley
ATTORNEY

2,843,293

AUTOMATIC VENDING MACHINE

Harris G. Burgoyne, Green Bay, Wis.

Application July 9, 1956, Serial No. 596,578

15 Claims. (Cl. 222—129.4)

This invention relates to a vending machine and more particularly to a coin or manually operated vending machine adapted to dispense beverages, soups or any form of liquid product formed from the mixture of powder, crystalline ingredients or dry material with a liquid.

A machine in accordance with this invention is particularly adaptable for the dispensing of hot or cold beverages, such as, for example, milk, hot or cold chocolate, coffee, cocoa, hot soups, bouillon, fruit or vegetable drinks and the like formed from crystalline or powdered ingredients. It is well known that the majority of food products which are prepared with a view to mixing them with hot or cold water for serving as a beverage can best be preserved in the dry state. An excellent example of this is powdered or crystalline chocolate milk. Such chocolate milk in the powdered, granular or crystalline form retains its flavor and may be sanitarily kept for longer periods of time than chocolate syrups. It is also true that other food products such as cocoa, soup concentrates, fruit and vegetable concentrates, coffee and other like products will retain their flavor in the dry powder or crystalline form far longer than in a concentrate liquid form if refrigerated or unrefrigerated.

In developing an economical and satisfactory machine which will store one or more food products in a dry state and dispense them in admixture with a hot or cold liquid the liquid vapor emanating from the liquid must be prevented from reaching the stored food products and causing them to become gummy and clog the dispensing unit. Further, an adequate mixing chamber must be provided for thoroughly mixing the food product with the liquid. The mixing chamber must thoroughly mix all of the food product dispensed from the food storage means with the liquid leaving no residue. The mixing chamber must be so provided that it aerates the product so that it has the taste, flavor and appearance of a freshly prepared beverage.

In accordance with the invention claimed, a new and improved vending machine is provided comprising a storage bin for ingredients and a mixing chamber adapted for communication with the bin. The chamber comprises a first funnel or cone shaped member and a second funnel or cone shaped member. The second member is positioned to receive the discharge from the first member. Means are arranged between the bin and the chamber for sequentially dispensing a measured quantity of ingredients from the bin into the first member. A water delivery conduit is arranged to lead into the second funnel shaped member and is adapted to be connected to a supply of hot or cold water. Valve means are provided within the conduit for providing a measured quantity of hot or cold water for movement into the second funnel shaped member upon actuation thereof. At the end of the conduit and within the second funnel shaped member is provided a nozzle means which is so positioned that hot or cold water is caused to swirl around within the second funnel or cone shaped member. Into this swirl is dispensed from the first funnel shaped member the measured quantity of ingredients. The first funnel shaped member aerates the ingredients as they pass therethrough so as to dispense them into the swirl of water in the second funnel shaped member in a disseminated and diffused manner for immediate and complete disintegration. Means for actuating the ingredients dispensing means and the valve means in the hot or cold water supply conduit in a predetermined manner is provided for movement of the ingredients into the first funnel shaped member, through this first member, into the swirl of water in the second funnel shaped member and out of this second member in solution form.

It is therefore one object of the present invention to provide a new and improved vending machine.

Another object of this invention is to provide a new and improved vending machine which will dispense in a simple and sanitary method one or more food products in admixture with hot or cold liquid leaving no residue.

A further object of this invention is to provide a new and improved vending machine in which the dry powdered, granular or crystalline food product mixed in solution with a hot or cold liquid is aerated.

A still further object of this invention is to provide a new and improved mixing chamber for the admixture of a powdered granular or crystalline food product with a hot or cold liquid.

A still further object of this invention is to provide a new and improved vending machine which will mix in solution with a hot or cold liquid either high or low density, bulky or small volume dry powdered, granular, or crystalline food products leaving no residue.

A still further object of this invention is to provide a new and improved vending machine which will dispense one or more food products in admixture with a hot or cold liquid and which will prevent the vapors of the liquid from getting to the stored food product and thus clogging up the dispensing unit.

A still further object of this invention is to provide a new and improved mixing chamber for a vending machine which is heated or cooled to control the temperature of the admixture formed and passing therethrough.

Objects and advantages other than those set forth will be apparent from the following description when read in connection with the accompanying drawing, in which:

Fig. 1 is a diagrammatic view and wiring diagram of the elements of a vending machine embodying the invention;

Fig. 2 is an enlarged partial vertical sectional view of the storage bin, measuring device and mixing chamber illustrated in Fig. 1;

Fig. 3 is an enlarged partial vertical sectional view taken at right angles to the view shown in Fig. 2 of the storage bin, measuring device and mixing chamber illustrated in Fig. 1;

Fig. 4 is an enlarged exploded perspective view partly in section of the mixing chamber illustrated in Figs. 1 and 2;

Fig. 5 is an enlarged elevational view partly in section of a modification of the lower funnel shaped mixing member of the mixing chamber illustrated in Figs. 1 to 4, inclusive; and Fig. 6 is an enlarged elevational view of a further modification of the lower funnel shaped mixing member of the mixing chamber illustrated in Figs. 1 to 5, inclusive.

Referring more particularly to the drawing by characters of reference, Fig. 1 illustrates diagrammatically a mixing and dispensing mechanism comprising a reservoir or tank 5 constituting a source of fluid or liquid under pressure which will be assumed herein to be hot or refrigerated water supplied by a system (not shown), a storage bin 6 for dry powder, granular or dry crystalline ingredients, an ingredient measuring device 7, a mixing chamber 8, a dual purpose control means 9, and a cup magazine 10 with a holder 11 for a cup 12 at the lower end thereof. The coin control mechanism is generally indicated at 13. The mixing and dispensing mechanism is operated by the dual purpose control means 9 comprising a motor 14 and a series of cams 15, 16 and 17 mounted on a motor driven shaft 18.

Water is admitted to tank 5 through an inlet pipe 19 and provision is made for heating or cooling the water by means of an electric heating or cooling element 20 connected in series with a thermostatic control device 21 across an electric power circuit 22, 22$^1$. The thermostatic control device 21 is of the well known type and is adapted to control the supply of electrical energy to element 20 to maintain a desired temperature of the water in tank 5. A drain pipe 25 is provided at the bottom of tank 5 with a manually operated valve 23 therein, and a relief valve 24 is arranged at the top of tank 5 to relieve pressure in the tank if it should become overheated. Tank 5 is supplied with water under pressure through inlet pipe 19 and furnishes heated or cold water under pressure to the mixing chamber 8 through an outlet pipe 26. The flow of water under pressure from tank 5 through pipe 26 is controlled by a solenoid controlled valve 27.

Device 7 as shown in Figs. 2 and 3 comprises a reciprocally mounted body 33 defining a hollow parallelpiped cavity 35 which is opened along opposite sides of the body for successively and independent registry with bin 6 and chamber 8. The parallelepiped cavity 35 when in registry with the open or funnel end of bin 6 fills up with the powder or crystalline ingredients from bin 6 and when in registry with a chute shaped member 29 leading to chamber 8 disperses the powder or crystalline ingredients through member 29 and into chamber 8. Device 7 is actuated from bin filling position to mixing chamber dispersing position by a solenoid 34 which is energized by power circuit 22, 22$^1$. The parallelepiped cavity 35 of measuring device 7 is biased to the bin loading position by spring 38 and is overcome by solenoid 34 when energized to move along a track formed by end 39 of chute shaped member 29 and a flange 40 mounted on the base of the funnel shaped end of bin 6. A pair of flanges 41 and 42 formed on the ends of parallelepiped cavity 35 and arranged parallel with end 39 of member 29 and flange 40 of bin 6 form guiding means for cavity 35. Flange 41 also serves as a means for closing the funnel end of bin 6 while the measuring device 7 is moved from bin filling position to mixing chamber dispersing position, and flange 42 closes and opening 43 in the end 39 of the chute shaped trough 29 when the measuring device is moved from the mixing chamber dispersing position to bin loading position. Solenoid 34 is connected to the body 33 forming parallelepiped cavity 35 by a connecting rod 44.

As shown more clearly in Figs. 2 and 3, the enclosed trough-like member 29 is provided for conducting the ingredients from the measuring device 7 to the mixing chamber 8 arranged at the discharge end of trough-like member 29. Member 29 is provided with a slidable mounted end plate 30 which may be clamped at any one of a number of positions over the discharge passageway of trough-like member 29 to control the volume of the ingredients flowing or passing therethrough at any given time. In this manner the flow of ingredients to the mixing chamber 8 may be controlled so that the mixing chamber may adequately handle a large bulk of material uniformly over a predetermined cycle leaving no residue.

The mixing chamber 8 comprises a first funnel or cone shaped member 45 and a second funnel or cone shaped member 46. Members 45 and 46 comprising wide-mouthed conical vessels terminating in tube or collar-like members are provided with end plates 47 and 48, respectively. Plates 47 and 48 are provided with apertures 49 and 50, respectively, which provide the inlet openings for the mixing chamber members 45 and 46. The end 30 of trough-like member 29 fits into aperture 49 in plate 47 of funnel shaped member 45 to discharge into member 45 the food products dropped into member 29. As noted from the drawing funnel shaped member 46 is positioned longitudinally of the funnel shaped member 45 with the longitudinal axis of member 46 arranged parallel with but spaced from the longitudinal axis of member 45. Although this misalignment of members 45 and 46 is desirable for the complete admixture of certain dry food products with a liquid it is not necessary for the complete admixture of most dry food products with a liquid leaving no residue. The tube or collar end 51 of member 45 fits loosely into aperture 50 of end plate 48 of member 46.

Mounted around member 45 and over the aperture 50 of member 46 is an exhaust chamber 52. Chamber 52 which may be secured to a fixed portion of the machine forms an exhaust passage for the steam or water vapor to pass from the mixing chamber 46 through aperture 50, around the outside of tube 51 of member 45 which is shown as extending within aperture 50, the inside of exhaust chamber 52, and a passage 53 to atmosphere. An exhaust fan 54 mounted in passage 53 provides the means of draining the mixing chamber 46 and in turn the inside of the vending machine of vapors of any kind which might moisten the dry ingredients in bin 6.

As shown more clearly in Fig. 4, the mixing chamber 46 is provided with nozzle means comprising a plurality of inlet pipes 55 connected to pipe 26 and so positioned that they cause the hot or cold water to swirl around the inside of member 46 and more particularly the inside wall of member 46 to provide a turbulence into which is dispensed in an aerated and loosely held mass a stream of dry powder, granular, or crystalline food product ingredients. The food product instantly dissolves in the swirl of liquid leaving no residue and is flushed through a tube or collar 56 into a tubular passageway 57 and then into cup 12. The swirl and turbulence of water in member 46 also aerates the solution formed of the food product and water to provide a refreshing and tasty beverage.

In order to obtain a hot beverage any time a coin is dropped into the machine or the machine is manually operated, means are provided for heating member 46, thereby reducing the heat loss of the water from tank 5 as it passes through the mixing chamber. If member 46 is heated sufficiently it could serve as a supplementary source of heat for the liquid used in forming the beverage. As shown in Fig. 4, the heating means may comprise an electric heating element 58 formed around the outside wall of the funnel shaped member 46 in the form of a yoke. Although element 58 is shown in the form of a yoke mounted around member 46, any form or shape of heating element for mixing chamber 8 is intended to be within the scope of this invention.

Fig. 5 illustrates a modification of the mixing chamber 8 shown in Figs. 1 to 4, inclusive, wherein a water jacket 59 is mounted around member 46. An inlet 61 of water jacket 59 is connected through suitable pipe connections to an outlet 60 of tank 5, and an outlet 62 of jacket 59 is connected through suitable pipe connections, a pump 63 and an inlet 64 to tank 5. Thus, hot or cold water can be circulated continually through jacket 59 of mixing chamber 46 to control the temperature of the solution passing through the mixing chamber.

As shown in Fig. 6, a vacuum chamber 65 may be mounted around chamber 46, if so desired, to preserve the temperature of the liquid moving through the inside of the mixing chamber.

The cups 12 are individually released at the proper time by means of fingers 70 and 71 positioned respectively below and above a pivot 72 of an arm carried at the end of an armature 73 of a solenoid 74 by which the cup releasing mechanism is operated. A cup, when released, drops into the holder 11 which is beneath an outlet end of the pipe or passageway 57 extending from the funnel shaped end of member 46 of the mixing chamber 8. The end of pipe 57 enters a lateral enlargement 75 on the lower part of the cup magazine 10, the latter part thereof being curved as shown in Fig. 1 so that the cup when in the holder 11 will be below the outlet end of pipe 57.

The coin control mechanism is shown diagrammatically as comprising a coin chute 76 with two coin supporting members 77 and 78 in the lower part thereof. Member 78 is slidably mounted and is attached to an armature 79 of a solenoid 80. Members 77 and 78 are made of conductive material and are arranged to support a coin 81 which electrically bridges the gap therebetween. When member 78 is withdrawn by the solenoid 80 the coin will drop into a cash box 82. The coin control is schematically shown and any suitable mechanical adaptation of this system may be used.

The circuits feeding the various solenoids and switches from power circuit 22, 22¹ will be indicated in the description of its operation. Upon the insertion of a coin in the coin chute 76, the coin falls upon the contact support members 77 and 78 bridging the gap therebetween and completing the electrical circuit from power conductor 22¹ through conductor 83, support member 78, coin 81, support member 77, conductor 84, motor 14, conductor 69 to power conductor 22. The energization of motor 14 causes rotation of the motor drive shaft 18 carrying the three cams 15, 16 and 17. Cam 16 upon rotation closes a switch 85 associated therewith, as well known in the art, thereby energizing the cup delivery solenoid 74 from conductor 22 through conductor 86, solenoid 74, conductor 87, switch 85, conductor 88, conductor 84, support member 77, coin 81, support member 78, conductor 83 and to conductor 22¹ of the power circuit. The closure of switch 85 by cam 16 also energizes solenoid 34 from conductor 22 through conductor 89, solenoid 34, conductor 90, switch 85, conductor 88, conductor 84, support member 77, coin 81, support member 78, conductor 83 to power conductor 22¹. Upon further rotation of shaft 18 of motor 14, cam 15 closes a switch 91 which energizes the solenoid of the valve 27 from conductor 22 through conductor 89, the solenoid of valve 27, conductor 92, switch 91, conductor 88, conductor 84, support member 77, coin 81, support member 83 and to the power conductor 22¹. Switch 91 remains open long enough to cause a measured amount of hot or cold water to flow downward into the mixing chamber 8 into which the powder or dry crystalline ingredients are being dispersed.

The crystalline, powder or granular food product ingredients such as crystalline milk or chocolate milk ingredients, are dispersed into member 45 of the mixing chamber 8 during the time or slightly before the hot water is injected into member 46 of chamber 8. The water is injected transversely to the path of movement of the dispersed ingredients and in a swirling movement around the inside wall of member 46 so that the hot water spray or turbulence picks up the crystalline ingredients and whirls them around until dissolved. The hot water and the crystalline ingredients are also aerated by swirling around in mixing chamber 8 before being flushed out into cup 12.

Further rotation of the cam shaft 18 of motor 14 causes the cam to open the switch 91 thereby deenergizing the solenoid of valve 27 and causing valve 27 to close.

Finally, further rotation of cam shaft 18 causes cam 17 to momentarily close switch 93 thereby energizing the coin release solenoid 80 from power conductor 22, through conductor 86, conductor 94, solenoid 80, conductor 95, switch 93, conductor 88, conductor 84, support member 77, coin 81, support member 78, conductor 83, and power conductor 22¹. This causes the coin to be released and to drop into the box 82. The releasing of coin 81 from support members 77 and 78 deenergizes the dispensing machine and it remains inactive until another coin is placed in the coin slot.

This new and improved sanitary and simple method and dispensing machine makes it possible to enjoy hot or cold beverages, soups, fruit and vegetable drinks of all kinds which are made from dry crystalline ingredients at a moment's notice. The crystalline ingredients are soluble in hot or cold water to form a beverage which has a smooth, even texture throughout. In the machine herein disclosed and claimed, the mixing chamber comprising the funnel or cone shaped members and the exhaust chamber may be readily taken apart for cleaning.

Although but a few embodiments of the present invention have been illustrated and described, it will be apparent to those skilled in the art that various changes and modifications may be made therein without departing from the spirit of the invention or from the scope of the appended claims.

What is claimed is:

1. A vending machine comprising a storage bin for ingredients, a mixing chamber adapted for communication with said bin, said chamber comprising a first funnel shaped member and a second funnel shaped member, said second member being positioned to receive along its inner walls the discharge of said first member, means arranged between said bin and said chamber for dispensing a measured quantity of ingredients from said bin into said first member, a water delivery conduit leading into said second member and adapted to be connected to a supply of water, valve means arranged within said conduit for providing a measured quantity of water for movement into said second member, nozzle means connected to said conduit and positioned for causing the water to swirl around within said second member, and means for actuating said ingredients dispensing means and said valve means in a predetermined manner to provide movement of the ingredients into said first member, through said first member, into the swirl of water in said second member and out of said second member in solution form.

2. A vending machine comprising a storage bin for dry food products, a mixing chamber adapted for communication with said bin, said chamber comprising a first funnel shaped member and a second funnel shaped member, said second member being positioned to receive along its inner walls the discharge of said first member, means arranged between said bin and said chamber for dispensing a measured quantity of the dry food products from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around within said second member, means for actuating said food products dispensing means and said valve means in a predetermined manner to provide a flow of the food products into said first member, through said first member, into the swirl of water in said second member and out of said second member in solution form, and means for heating the walls of said second member to control the temperature of the solution as it passes therethrough.

3. A vending machine comprising a storage bin for ingredients, a mixing chamber adapted for communication with said bin, said chamber comprising a first funnel shaped member and a second funnel shaped member, said second member being positiond to receive along its inner walls the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around within said second member, means for actuating said ingredients dispensing means and said valve means in a predetermined manner to provide a flow of the ingredients into said first member, through said first member, into the swirl of water in said second member and out of said second member in solution form, and electric means for heating the walls of said second member to control the temperature of the solution as it passes therethrough.

4. A vending machine comprising a storage bin for ingredients, a mixing chamber adapted for communication with said bin, said chamber comprising a first funnel shaped member and a second funnel shaped member, said second member being positioned to receive along its inner walls the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around within said second member, means for actuating said ingredients dispensing means and said valve means in a predetermined manner to provide a flow of the ingredients into said first member, through said first member, into the swirl of water in said second member and out of said second member in solution form, and means comprising a vacuum chamber arranged around said second member for reducing the temperature loss of the solution as it passes through said second member.

5. A vending machine comprising a storage bin for ingredients, a mixing chamber adapted for communication with said bin, said chamber comprising a first funnel shaped member and a second funnel shaped member, said second member being positioned to receive along its inner walls the discharge of said first member, means arranged between said bin and said chamber for dispensing a measured quantity of ingredients from said bin into said first member, a source of hot water, a water delivery conduit loading into said second member and adapted to be connected to said source of hot water, valve means arranged within said conduit for providing a measured quantity of hot water for movement into said second member, nozzle means connected to said conduit and positioned for causing said hot water to swirl around within said second member, means for actuating said ingredients dispensing means and said valve means in a predetermined manner to provide a flow of the ingredients into said first member, through said first member into the swirl of water in said second member and out of said second member in solution form, means comprising a water jacket arranged around the walls of said second member, and means comprising conduits connected to said source of hot water and said jacket for circulating hot water through said jacket to keep said second member at a predetermined temperature.

6. A vending machine comprising a storage bin for ingredients, a mixing chamber adapted for communication with said bin, said chamber comprising a first funnel shaped member and a second funnel shaped member, said second member being positioned around and longitudinally of said first member to receive along its inner walls the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around the inside wall of said second member, and means for actuating said ingredients dispensing means and said valve means in a predetermined manner to provide movement of the ingredients into said first member, through said first member, into the swirl of water in said second member and out of said member in solution form, said first member aerating the ingredients as they move through said first member and into said second member.

7. A vending machine comprising a storage bin for ingredients, a mixing chamber adapted for communication with said bin, said chamber comprising a first funnel shaped member and a second funnel shaped member, said second member being positioned longitudinally of said first member to receive along its inner walls the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around within said second member, means for actuating said ingredients dispensing means and said valve means in a predetermined manner to provide a flow of the ingredients into said first member, through said first member, into the swirl of water in said second member, and out of said second member in solution form, said first member aerating and dispersing the ingredients as they move through said first member and into said second member, and means for heating the walls of said second member to control the temperature of the solution as it passes therethrough.

8. A vending machine comprising a storage bin for ingredients, a mixing chamber adapted for communication with said bin, said chamber comprising a first funnel shaped member and a second funnel shaped member, said second member being positioned longitudinally of said first member with the longitudinal axis of said second member arranged parallel with but spaced from the longitudinal axis of said first member to receive the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around the inside wall of said second member, and means for actuating said ingredient dispensing means and said valve means in a predetermined manner to provide movement of the ingredients into said first member, through said first member and into the swirl of water in said second member and out of said second member in solution form, said first member aerating the ingredients as they move through said first member and into said second member.

9. A vending machine comprising a storage bin for ingredients, a mixing chamber adapted for communication with said bin, said chamber comprising a first funnel shaped member and a second funnel shaped member, said second member being positioned longitudinally of said first member with the longitudinal axis of said second member arranged parallel with but spaced from the longitudinal axis of said first member to receive the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around the inside wall of said second member, means for actuating said ingredient dispensing means and said valve means in a predetermined manner to provide movement of the ingredients into said first member, through said first member and into the swirl of water in said second member and out of said second member in solution form, said first member aerating the ingredients as they move through said first member and into said second member, and means for heating the walls of said second member to control the temperature of the solution as it passes therethrough.

10. A vending machine comprising a storage bin for ingredients, a mixing chamber adapted for communication with said bin, said chamber comprising a first funnel shaped member and a second funnel shaped member, said second member being positioned to receive along its inner walls the discharge of said first member, means arranged between said bin and said chamber for dispensing a measured quantity of ingredients from said bin into said first member, a water delivery conduit leading into said second member and adapted to be connected to a supply of water, valve means arranged within said conduit for providing a measured quantity of water for movement into said second member, nozzle means connected to said conduit and positioned for causing the water to swirl around within said second member, means for actuating said ingredients dispensing means and said valve means in a predetermined manner to provide movement of the ingredients into said first member, through said first member, into the swirl of water in said second member and out of said second member in solution form, and venting means connected to said mixing chamber for exhausting to atmosphere water vapors created in said second member.

11. A vending machine comprising a storage bin for dry food products, a mixing chamber adapted for communication with said bin, said chamber comprising a first funnel shaped member and a second funnel shaped member, said second member being positioned to receive along its inner walls the discharge of said first member, means arranged between said bin and said chamber for dispensing a measured quantity of the dry food products from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around within said second member, means for actuating said food products dispensing means and said valve means in a predetermined manner to provide a flow of the food products into said first member, through said first member, into the swirl of water in said second member and out of said second member in solution form, means for heating the walls of said second member to control the temperature of the solution as it passes therethrough, and venting means connected to said mixing chamber for exhausting to atmosphere vapors created by said swirl of hot water in said second chamber.

12. A vending machine comprising a storage bin for ingredients, a mixing chamber adapted for communication with said bin, said chamber comprising a first funnel shaped member and a second funnel shaped member, said second member being positioned longitudinally of said first member with the longitudinal axis of said second member arranged parallel with but spaced from the longitudinal axis of said first member to receive the discharge of said first member, means arranged between said bin and said chamber for dispensing a measured quantity of ingredients from said bin into said first member, a water delivery conduit leading into said second member and adapted to be connected to a suuply of hot water, valve means arranged within said conduit for providing a measured quantity of hot water for movement into said second member, nozzle means connected to said conduit and positioned for causing the hot water to swirl around the inside wall of said second member, means for actuating said ingredient dispensing means and said valve means in a predetermined manner to provide movement of the ingredients into said first member, through said first member and into the swirl of water in said second member and out of said second member in solution form, said first member aerating the ingredients as they move through said first member and into said second member, and venting means connected to said mixing chamber for exhausting to atmosphere vapors created by said swirl of hot water in said second member.

13. A vending machine comprising a storage bin for ingredients, a mixing chamber adapted for communication with said bin, said chamber comprising a first funnel shaped member and a second funnel shaped member, said second member being positioned longitudinally of said first member with the longitudinal axis of said second member arranged parallel with but spaced from the longitudinal axis of said first member to receive the discharge of said first member, means arranged between said bin and said chamber for dispensing a measured quantity of ingredients from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around the inside wall of said second member, means for actuating said ingredients dispensing means and said valve means in a predetermined manner to provide movement of the ingredients into said first member, through said first member and into the swirl of water in said second member and out of said second member in solution form, said first member aerating the ingredients as they move through said first member and into said second member, means for heating the walls of said second member to control the temperature of the solution as it passes therethrough, and venting means connected to said mixing chamber for exhausting to atmosphere vapors created by said swirl of hot water in said second member.

14. A vending machine comprising a storage bin for ingredients, a mixing chamber adapted for communication with said bin, said mixing chamber comprising a first funnel shaped member and a second funnel shaped member, said second member being positioned to receive along its inner walls the discharge of said first member, means arranged between said bin and said mixing chamber for dispensing a measured quantity of ingredients from said bin into said first member, a water delivery conduit leading into said second member and adapted to be connected to a supply of water, valve means arranged within said conduit for providing a measured quantity of water for movement into said second member, nozzle means connected to said conduit and positioned for causing the water to swirl around within said second member, means for actuating said ingredients dispensing means and said valve means in a predetermined manner to provide movement of the ingredients into said first member, through said first member, into the swirl of water in said second member and out of said second member in solution form, and venting means comprising an exhaust chamber mounted around said first member and positioned around the receiving end of said second member for exhausting to atmosphere water vapors created in said second member.

15. A vending machine comprising a storage bin for dry food products, a mixing chamber adapted for communication with said bin, said mixing chamber comprising a first funnel shaped member and a second funnel shaped member, said second member being positioned to receive along its inner walls the discharge of said first member, means arranged between said bin and said mixing chamber for dispensing a measured quantity of the dry food products from said bin into said first member, a water delivery conduit leading into said second member and adapted to be connected to a supply of hot water, valve means arranged within said conduit for providing a measured quantity of hot water for movement into said second member, nozzle means connected to said conduit and positioned for causing the hot water to swirl around within said second member, means for actuating said food products dispensing means and said valve means in a predetermined manner to provide a flow of the food products into said first member, through said first member, into the swirl of water in said second member and out of said second member in solution form, means for heating the walls of said second member to control the temperature of the solution as it passes therethrough, and venting means comprising an exhaust chamber mounted around the receiving end of said second member, an exhaust passage connected to said exhaust chamber and extending out of said machine to atmosphere and an exhaust fan mounted within said passage for exhausting from the receiving end of said second member through said exhaust chamber and passage to atmosphere vapors created by said swirl of hot water in said second member.

References Cited in the file of this patent

UNITED STATES PATENTS

| | | |
|---|---|---|
| 2,160,043 | Threm | May 30, 1939 |
| 2,558,522 | Knapp | June 26, 1951 |
| 2,621,838 | Price | Dec. 16, 1952 |
| 2,680,802 | Bremer et al. | June 8, 1954 |